ically, our invention com-
United States Patent Office 3,006,743
Patented Oct. 31, 1961

3,006,743
SOLID COMPOSITE PROPELLANTS
CONTAINING DECABORANE
Homer M. Fox and John A. Keller, Bartlesville, Okla.,
assignors to Phillips Petroleum Company, a corporation of Delaware
No Drawing. Filed Jan. 3, 1956, Ser. No. 556,779
18 Claims. (Cl. 52—.5)

This invention relates to solid propellants for rockets. In one aspect this invention relates to a high energy rocket propellant. In another aspect this invention relates to a method for manufacturing a high energy rocket propellant.

Solid propellants can be classified with respect to composition as double base type, single base type, and composite type. An example of a double base propellant is "ballistite" which comprises essentially nitroglycerine and nitrocellulose. Examples of single base propellants are nitrocellulose and trinitrotoluene. Composite type propellants are generally composed of an oxidizer, and a binder or fuel. They may contain other materials to improve fabrication or increase ballistic performance such as a burning rate catalyst.

Rocket propellants have achieved considerable commercial importance as well as military importance. Jet propulsion motors of the type in which the propellants of this invention are applicable can be employed to aid a heavily loaded plane in take off. Said motors can also be employed as an auxiliary to the conventional power plant when an extra surge of power is required. Said motors can also be employed to propel projectiles.

Recently there has been much interest in the development of high energy rocket propellants. Much effort is being expended to develop propellants having a specific impulse of about 260 or greater. With a high specific impulse propellant, a higher burn out velocity (the velocity of the rocket at the time all the propellant is consumed) can be attained than when using the same weight of a propellant having a lower specific impulse. Thus, the use of higher specific impulse propellants makes it possible to use less propellant, or to carry more payload. More payload is particularly important in military aircraft where the amount of armament carried by the aircraft could well be limited by the amount of fuel which it is necessary for the aircraft to carry.

We have discovered a new high energy propellant. We have found that by incorporating decaborane as a component of a composite rocket propellant we can obtain a propellant having a specific impulse of about 260 or greater. Thus, broadly speaking, our invention comprises a rocket propellant, and a method for making said propellant, which is comprised of an oxidizer, decaborane, and a suitable binder.

The term "specific impulse" as used herein is defined as the impulse derived when one pound of propellant is consumed.

An object of this invention is to provide an improved solid propellant for rockets. Another object of this invention is to provide a solid propellant having a specific impulse of about 260 or greater. Another object of this invention is to provide a high energy rocket propellant comprising ammonium perchlorate, decaborane, and a butadiene-methylvinylpyridine copolymer binder. Another object of this invention is to provide a method of manufacturing a solid propellant having a specific impulse of about 260 or greater. Still another object of this invention is to provide a method of manufacturing a high energy rocket propellant comprising ammonium perchlorate, decaborane, and a butadiene-methylvinylpyridine copolymer binder. Other aspects, objects and advantages of the invention will be apparent to those skilled in the art in view of this disclosure.

Thus according to the invention, there is provided a high energy rocket propellant comprising an intimate admixture of a suitable oxidizer, a suitable binder, and decaborane.

Decaborane, $B_{10}H_{14}$, exists at ordinary temperatures and pressures in the form of colorless crystals. It has a melting point of 99.7° C. and a boiling point of 213° C. In addition to its relatively high melting point, decaborane is stable and relatively inert, under the conditions of propellant fabrication, toward the other components of the propellant. The above-mentioned properties of decaborane render it particularly advantageous for use as a component of high energy propellants. Broadly speaking, the ratio of oxidizer to decaborane by weight in our propellant can be within the range of 18/1 to 2/1; preferably said ratio is within the range of 8.5/1 to 4.5/1. On the basis of the propellant composition as a whole, the ingredients can be present in the following range: oxidizer, a major amount of from 60 to 90% by weight; decaborane, a minor amount of 5 to 30% by weight; and binder, a minor amount of from 2 to 35% by weight.

While ammonium perchlorate, because of its low cost and ready availability, is our presently preferred oxidizer, other oxidizers can be employed in our propellant. For example, other oxidizers which can be employed include among others, hexanitroethane, hydrazine perchlorate, hydrazine diperchlorate, nitrosyl-perchlorate, nitronium perchlorate, and potassium perchlorate.

A presently preferred binder material can be prepared from conjugated diene-vinylpyridine copolymers having Mooney values (ML–4) in the range between 15 and 30, an organic acid content not greater than 1.5 weight percent, a soap content not greater than 1 weight percent and an ash content not greater than 1.5 weight percent. Such copolymers are superior binders in solid propellant compositions. However other conjugated diene-vinylpyridine copolymers can also be used. In addition to the copolymer, the finished binder usually contains various compounding ingredients and sometimes contains a burning rate catalyst. It is generally preferred that carbon black be present in the binder compositions although the presence of carbon black is not essential to the production of satisfactory propellant compositions. The amount of carbon black in the copolymer can be in the range of 0 to 35 parts by weight per hundred parts of the copolymer. Propellants containing these conjugated diene-vinylpyridine copolymers as binders have better ballistic and mechanical properties than similar propellant compositions in which low Mooney conjugated diene-styrene copolymers are employed as binders.

The copolymers employed in this propellant compositions are prepared by emulsion polymerization at temperatures generally in the range between 0 and 140° F. Recipes such as the iron pyrophosphate-hydroperoxide, either sugar-free or containing sugar, sulfoxylate and persulfate are applicable. In these recipes at least 5 parts by weight of emulsifier, and preferably 6 parts, are employed per hundred parts of monomer with as much as 9 parts being applicable. It is generally preferred that polymerization be continued to between 80 and 90 percent conversion. However, polymers prepared from 50 percent to quantitative conversion are applicable. Polymerization is effected under conditions so as to yield polymers having a Mooney value (ML-4) in the range between 15 and 30. The electrolyte content in the polymerization system should be kept at a minimum and a surface active agent such as Daxad 11 (sodium salt of condensed alkyl aryl sulfonic acid) is generally used. A more stable latex is obtained when operating in this manner than in the absence of Daxad 11.

The presently preferred copolymer is prepared from a monomer charge to the polymerization zone which contains from 5 to 50 percent by weight of polymerizable heterocyclic nitrogen base and from 50 to 95 percent by weight of the conjugated diene.

The conjugated dienes employed are those containing from 4 to 8 carbon atoms per molecule and include 1,3-butadiene, isoprene, 2-methyl-1,3-butadiene, 2,3-dimethyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable in the polymeric binders of this invention.

Instead of using a single conjugated diene, a mixture of conjugated dienes can be employed. Thus a mixture of 1,3-butadiene and isoprene can be employed as the conjugated diene portion of the copolymer.

The polymerizable heterocyclic nitrogen bases which are applicable for the production of the polymeric materials are those of the pyridine and quinoline series which are copolymerizable with a conjugated diene and contain one and only one

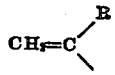

substituent wherein R is either hydrogen or a methyl group. That is, the substituent is either a vinyl or an alpha-methylvinyl (isopropenyl) group. Of these compounds, the pyridine derivatives are of the greatest interest commercially at present. Various substituted derivatives are also applicable but the total number of carbon atoms in the nuclear substituted groups, such as alkyl groups, should not be greater than 12 because the polymerization rate decreases somewhat with increasing size of the alkyl group. Compounds where the alkyl substituents are methyl and/or ethyl are available commercially.

These heterocyclic nitrogen bases have the formula

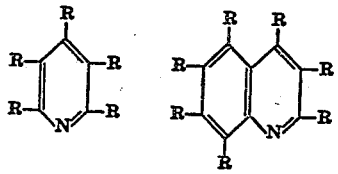

or

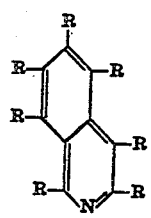

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 12. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methyl-henyl)-3-vinyl-4-methylpyridine; 3-vinyl-5-(hydroxyphenyl)-pyridine; 2-vinlquinoline; 2-vinyl-4-ethylquinoline; 3-vinyl-6,7-di-n-propylquinoline; 2-methyl-4-nonyl-6-vinylquinoline; 4(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

Methods for the preparation of the above described conjugated diene-heterocyclic nitrogen base copolymers are disclosed and claimed in copending application Serial No. 470,371, filed November 22, 1954, by R. S. Hanmer et al.

Another superior binder material is one prepared from a copolymer of a conjugated diene with a vinyl heterocyclic nitrogen base of the pyridine and quinoline series and a quaternizing agent. Quaternizing agents which can be used include, for example, methyl iodide, benzotrichloride, benzylchloride, diethylbromomalonate and ethyl alpha-chloroacetoacetate. These superior binder materials and the method of producing them are disclosed and claimed in copending application Serial No. 284,447, filed April 25, 1952, by W. B. Reynolds and J. E. Pritchard entitled "Solid Rocket Propellant Compositions."

As mentioned above the finished binder usually contains various compounding ingredients and can contain a burning rate catalyst. Thus it will be understood that herein and in the claims, unless otherwise specified, the term "binder," when employed in connection with a conjugated diene-heterocyclic nitrogen base copolymer, is employed generically and can include a burning rate catalyst, and various compounding ingredients.

Curing agents which can be used in vulcanizing or curing the copolymers, utilized in the propellant grains of this invention, include the well known curing agents used in the art such as vulcanizing agents, including sulfur and sulfur compounds such as tetramethylthiuram disulfide, tetraethylthiuam disulfide and the like; accelerators such as the condensation product of mercaptobenzothiazole and cyclohexylamine, mercaptobenzothiazole, benzothiazyl disulfide, dithiocarbamates, zinc oxide, stearic acid, and the like; antioxidants such as hydroquinone benzylether, phenyl-β-naphthylamine, and the like; and other materials such as stiffeners, plasticizers and fillers.

If carbon black is to be used in the binder composition, it is generally added as an aqueous slurry to the latex or alternatively carbon black can be milled directly into the dry polymer.

Commonly used combustion rate catalysts which can be utilized in the propellant grains of our invention include metal ferrocyanides and ferricyanides. Ferric ferrocyanides, such as Prussian blue, Berlin blue, Hamburg blue, Chinese blue, Paris blue, Milori blue, soluble ferric ferrocyanide such as soluble Berlin or Prussian blue which contains potassium ferric ferrocyanide, and ferric ferrocyanide which has been treated with ammonia, are among the materials which can be used. Ferrous ferricyanide (Turnbull's blue) is also applicable. Milori blue is a pigment similar to Prussian blue but has a red tint and is prepared by the oxidation of a paste of potassium ferrocyanide and ferrous sulfate. Other metal compounds such as nickel and copper ferrocyanides, ammonium dichromate, and ferric oxide (rouge) can also be utilized.

The binder used as a component of our novel propellant mixture can be any of the copolymers disclosed in the above referred to copending applications. Said binder component can also be a natural rubber.

Any of the above described binders can be employed in the practice of our invention. In addition, many plastic, resinous, and other rubbery materials are suitable binder materials for the propellant of our invention. Thus the invention is not to be limited to any particular binder. Examples of other suitable binders can be grouped as follows: asphalt and pitches including natural asphalts having a 170° F. softening point, air blown asphalts having a 270° F. softening point, mixtures of asphalt and synthetic or natural rubber, pitch having a 240° F. softening point, and mixture of pitch and rubber; epoxy resins, such as Araldite 502 and Epon 834; liquid polymers such as polybutadiene, polybutene, polyisobutylene, and Thiokol LP-3; polyethylenes; rubbers, both natural and synthetic, such as, butadiene-heterocyclic nitrogen base copolymers, butadiene-styrene copolymers, butyl rubber, ethyl acrylate-methylvinylpyridine copolymers, polybutadiene, and hydrogenated polybutadiene; waxes, both natural and synthetic having a melting point within the range of 150–300° F.; synthetic resins and plastics such as the various acrylic and polyvinyl resins; and nitro polymers such as polynitro methmethacrylate, nitro polybutadiene and polynitrovinyl alcohols.

High specific impulse propellants inherently require high solids loading. Therefore, in general, conventional blending or casting methods are not applicable to the manufacture of our high energy propellants. Thus, as an added feature of our invention, there is provided a method of manufacturing a high energy propellant compirsing an oxidizer, decaborane, and a binder.

In one method for the preparation of our propellants, the oxidizer and decaborane are first pulverized to about a 200 mesh. Said pulverized materials are then dry blended with the binder, and the dry blend is then compression molded under a pressure within the range of 5,000 to 15,000 pounds per square inch gauge, for a period of time within the range of 5 to 30 minutes, and at a temeprature within the range of 70 to 200° F. After removal from the mold, the propellant can be cured or not cured depending upon the binder used and the final properties desired in the propellant. If it is desired to cure the propellant, said curing is usually carried out at a temperature within the range of 160 to 250° F. for a period of time within the range of 5 to 48 hours.

Another method for the manufacture of the propellants of our invention comprises dissolving the binder in a suitable solvent, normal heptane, cyclohexane, benzene, acetone, etc., and then coating the finely divided dry blend of oxidizer and decaborane with the binder solution. Said coating is preferably carried out in a mixing vessel equipped with suitable agitation means. After the particles of oxidizer and decaborane have been sufficiently coated with the binder solution, the solvent is removed by evacuation of the mixing vessel, agitation being continued during said removal of the solvent. After removal of all the solvent has been accomplished, and sufficient mixing of the components has occurred, the blend is transferred to the compression mold apparatus and molded as described above.

EXAMPLE I

A butadiene/2-methyl-5-vinylpyridine (MVP) copolymer was prepared by emulsion polymerization at 41° F. in accordance with the following recipe:

|   | Parts by weight |
|---|---|
| Water | 180 |
| Butadiene | 90 |
| 2-methyl-5-vinylpyridine [1] | 10 |
| Potassium fatty acid soap [2] | 6 |
| KOH | 0.1 |
| KCl | 0.1 |
| Daxad 11 [3] | 0.3 |
| $K_4P_2O_7$ | 0.33 |
| $FeSO_4 \cdot 7H_2O$ | 0.278 |
| Diisopropylbenzene hydroperoxide | 0.214 |
| Tert-dodecyl mercaptan | 0.45 |

*Booster recipe*

|   | |
|---|---|
| Water | 10 |
| $K_4P_2O_7$ | 0.165 |
| $FeSO_4 \cdot 7H_2O$ | 0.139 |
| Diisopropylbenzene hydroperoxide | 0.107 |
| Tert-dodecyl mercaptan | 0.45 |

[1] Inhibitor present, 0.07 wt. percent tert-butylcatechol.
[2] Potassium office synthetic rubber soap.
[3] Sodium salt of condensed alkyl aryl sulfonic acid.

The ingredients in the booster recipe were added when 60 percent conversion was reached. The reaction was continued to 88 percent conversion (total reaction time, 25.5 hours). After stripping, the coagulated copolymer had a Mooney value (ML-4) of 23.

A binder component for a propellant is prepared by combining the following materials:

|   | Parts by weight |
|---|---|
| 90/10 butadiene/MVP copolymer | 100 |
| Furnace carbon black | 20 |
| Flexol TOF [1] | 20 |
| Benzotrichloride | 6.6 |
| Sulfur | 1.75 |
| Butyl eight [2] | 2 |
| Zinc oxide | 5 |
| Aerosol OT [3] | 1 |

[1] Tri-2-ethylhexyl phosphate.
[2] Dithiocarbamate.
[3] Sodium dioctyl sulfosuccinate.

A group of propellant charges having varying amounts of ammonium perchlorate oxidizer, the above binder component and decarborane is then prepared by the dry blending procedure described above. Grains are produced by compression molding. Table I given below lists the compositions of said propellants and the specific impulse obtained when each is tested in a rocket motor.

TABLE I

| Composition | | | Specific Impulse (Isp), lb. force-sec./lb. mass |
|---|---|---|---|
| $NH_4ClO_4$, percent wt. | 90/10 Bd/MVP Copolymer, percent wt. | Decaborane, percent wt. | |
| 90.0 | 5.0 | 5.0 | 262 |
| 87.5 | 5.0 | 7.5 | 268 |
| 85.0 | 5.0 | 10.0 | 270 |
| 82.5 | 5.0 | 12.5 | 272 |
| 80.0 | 5.0 | 15.0 | 274 |
| 77.5 | 5.0 | 17.5 | 275 |

EXAMPLE II

A second group of propellants is prepared using an ammonium perchlorate oxidizer component, and the above binder component. Table II given below lists the compositions of said propellants and the specific impulse obtained when each is tested in a rocket motor.

TABLE II

| Composition | | Specific Impulse (Isp), Lb. force-Sec./lb. mass |
|---|---|---|
| NH₄ClO₄, percent wt. | 90/10 Bd/MVP Copolymer, percent wt. | |
| 90.0 | 10.0 | 236 |
| 87.5 | 12.5 | 241 |
| 85.0 | 15.0 | 240 |
| 82.5 | 17.5 | 235 |
| 80.0 | 20.0 | 229 |

The advantage of using decaborane in our propellant is evident from a comparison of the above Tables I and II.

Our propellants can be formed into grains of any desider configuration so as to fit the combustion chamber of the rocket motor in which they are to be used. Thus, our propellants can be formed into external burning grains, internal burning grains, and external-internal burning grains. Also, any suitable type of restrictor material can be placed on any desired portion on the surfaces of our propellants so as to control the burning of said propellants. A presently preferred type of restrictor material is one of the above described butadiene alkyl vinylpyridine copolymer binder materials.

As will be evident to those skilled in the art, in view of the above discussion and disclosure, various modifications of the invention can be made and carried out without departing from the spirit or scope of said invention.

We claim:

1. A propellant composition consisting essentially of an intimate admixture of from 60-90 percent by weight of an oxidizer component selected from the group consisting of ammonium perchlorate, hexanitroethane, hydrazine perchlorate, hydrazine diperchlorate, nitrosyl-perchlorate, nitronium perchlorate, and potassium perchlorate; from 2-35 percent by weight of a binder component selected from the group consisting of rubbery polymers and copolymers, natural and synthetic rubber, asphalts, waxes, pitches, epoxy resins, polyethylene, acrylic and polyvinyl resins, and nitro polymers; and from 5-30 percent by weight of decaborane.

2. A propellant composition according to claim 1 wherein said oxidizer is ammonium perchlorate.

3. A propellant composition according to claim 1 wherein said oxidizer is potassium perchlorate.

4. A propellant composition according to claim 1 wherein said oxidizer is hexanitroethane.

5. A propellant composition according to claim 1 wherein said oxidizer is hydrazine perchlorate.

6. A propellant composition according to claim 1 wherein said oxidizer is hydrazine diperchlorate.

7. A propellant composition according to claim 1 wherein said binder consists essentially of a rubber material.

8. A propellant composition according to claim 1 wherein said binder consists essentially of a copolymer of a conjugated diene containing from 4 to 8 carbon atoms per molecule with a

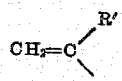

substituted heterocyclic nitrogen base selected from the group consisting of pyridine, quinoline, alkyl substituted pyridine, and alkyl substituted quinoline, wherein the total number of carbon atoms in the nuclear alkyl substituents is not more than 12 and wherein R' is selected from the group consisting of hydrogen and a methyl radical.

9. A propellant composition according to claim 8 wherein said binder consists essentially of a conjugated diene-vinylpyridine copolymer.

10. A propellant composition according to claim 8 wherein said binder consists essentially of a conjugated diene-vinylquinoline copolymer.

11. A propellant composition according to claim 1 wherein said binder consists essentially of a butadiene-lower alkyl vinylpyridine copolymer.

12. A propellant composition according to claim 1 wherein said binder consists essentially of a copolymer of 1,3-butadiene and 2-methyl-5-vinylpyridine.

13. A propellant composition according to claim 1 wherein said binder consists essentially of a copolymer of 1,3-butadiene and 2-vinylpyridine.

14. A propellant composition according to claim 1 wherein said binder consists essentially of a copolymer of 1,3-butadiene and 2-ethyl-5-vinylpyridine.

15. A propellant composition according to claim 2 wherein the weight ratio of ammonium perchlorate and decarborane is within the range of 18/1 to 2/1.

16. A propellant composition according to claim 2 wherein the weight ratio of ammonium perchlorate to decarborane is within the range of 8.5/1 to 4.5/1.

17. A solid propellant charge according to claim 1 wherein said oxidizer is ammonium perchlorate and said binder consists essentially of a copolymer of 1,3-butadiene and a lower alkyl-vinylpyridine.

18. A solid propellant charge according to claim 1 wherein said oxidizer is ammonium perchlorate and said binder consists essentially of a copolymer of 1,3-butadiene and 2-methyl-5-vinylpyridine.

References Cited in the file of this patent

Proell et al.: "The Journal of Space Flight," volume 2, No. 1, January 1950, pages 4 and 5.